United States Patent [19]

Moore

[11] Patent Number: 5,749,324
[45] Date of Patent: May 12, 1998

[54] APPARATUS AND METHOD FOR CONTROLLING ANIMAL BEHAVIOR

[76] Inventor: Steven Jerome Moore, 9 Sonoma Rd., Cortlandt Manor, N.Y. 10566

[21] Appl. No.: 581,807

[22] Filed: Jan. 2, 1996

[51] Int. Cl.⁶ .................................................. A01K 15/00
[52] U.S. Cl. .................................. 119/719; 119/718
[58] Field of Search ........................ 119/718, 719, 119/720, 721, 859, 908; 340/573

[56] References Cited

U.S. PATENT DOCUMENTS

| | | | |
|---|---|---|---|
| 3,673,567 | 6/1972 | McClellan, Sr. | 119/718 |
| 4,745,882 | 5/1988 | Yarnall, Sr. et al. | 119/721 |
| 4,947,795 | 8/1990 | Farkas | 119/718 |
| 4,967,696 | 11/1990 | Tobias | 119/719 |
| 5,046,453 | 9/1991 | Vinci | 119/718 |
| 5,054,007 | 10/1991 | McDonough | 367/139 |
| 5,061,918 | 10/1991 | Hunter | 119/718 X |
| 5,207,179 | 5/1993 | Arthur et al. | 119/721 |
| 5,365,219 | 11/1994 | Wong et al. | 340/573 |

*Primary Examiner*—Gene Mancene
*Assistant Examiner*—Yvonne R. Abbott

[57] ABSTRACT

An apparatus for controlling animal behavior comprising a sound-processing means selectively responsive to a plurality of sounds, an actuator means coupled to the sound-processing means selectively responsive to a plurality of electrical inputs from the sound processing means, and a stimulus generating means coupled to the actuator means. The stimulus provided an animal may include a human voice command with respect to the behavior correlated with the sound produced by the animal.

11 Claims, 6 Drawing Sheets

APPARATUS AND METHOD FOR CONTROLLING ANIMAL BEHAVIOR

BACKGROUND OF INVENTION

1. Field of Invention

The field of the present invention generally relates to a method and apparatus for controlling animal behavior. More specifically, it relates to the use of a sound-activated, stimulus-generating, device for interrupting such behaviors.

2. Brief Description of the Prior Art

As any owner of a domesticated animal can attest, animals have a mind of their own, a mind which often runs counter to that of the owner. Numerous devices have been developed over the millennia for controlling the actions of animals and directing their attention away from certain behaviors.

One of the simplest of animal control devices in use today is the choke-chain. A choke-chain is typically fabricated from metal and consists of interlocking repeating links terminated in two dissimilarly sized rings. By placing one ring through the other, the choke-chain acts as a collar that may be tightened as a noose. By tugging on the smaller ring end, the chain tightens providing a tactile feel and sound which dissuades an animal from veering from a particular path or participating in activities which might irritate others, such as barking.

Other devices that have been used for centuries to control animal behavior include the whip and the spur. A whip is flexible semi-stiff rod, usually with a handle, that is used to strike an animal when certain undesired behaviors are elicited, such as when a horse rears up against a trainer. Most whips are designed to produce only a mild buffeting of the animal, fear being induced in the animal more so owing to the loud sound produced by the instrument when it is drawn back and forth, that is snapped. Spurs are pointed devices secured to a rider's heel which are also designed to provide a nocuous stimulus to an animal. They are often used by a ridder to urge an animal to move quicker.

More recently, electronic devices have been introduced to control animal behavior. For example, the well-known "cattle-prod" consists of a rod which produces an electric shock upon contacting an animal. Cattle-prods are generally used to move animals which remain stationary after physical attempts to move them fail. They are sometimes also used to punish an animal for undesired behavior.

The problem with devices such as the choke-chain, the whip, the spur, and the cattle-prod is that they require the person who is inflicting the adverse stimulus (in the hope of deterring undesired animal behavior) to be in close proximity to the animal. In order to resolve this problem, some have proposed electronic nocuous devices which are responsive to remote control, such as the electronic nose clip of U.S. Pat. No. 5,307,759 to Rose disclosed to be useful in training animals to develop conditioned behaviors in response to operation of the apparatus. However, these devices also suffer from a drawback, shared with devices such as the choke-chain, the whip, the spur, and the cattle-prod, that is, the need for the trainer to maintain constant vigilance over the animal. Furthermore, the activation of such a device unaccompanied by a verbal command may cause confusion in an animal with regard to what type of behavior is expected from the trainer (e.g., "down" or "sit").

Several restraining devices which require little vigilance over an animal and which permit remote induction of a nocuous stimulus are available for preventing an animal from roaming outside of a certain perimeter. The most basic of these is the leash, which is a line for restraining an animal which is conventionally attached to a collar placed around an animal's body. A leash restricts animal movement by the sheer physical constraint of its length. An animal attempting to reach a destination outside of the perimeter allowed by the leash is dealt a jerking blow. Many municipalities require, pursuant to so-called "leash laws," that any pet outside of a home be on a leash.

More recently, several electronically-based devices for restricting roaming which require little vigilance over the animal and which permit remote induction of aversive stimuli have been disclosed. These "electronic leashes" involve attachment of an aversive, nocuous, stimulus-generating device to the body of the animal which is to be controlled. Such aversive stimulus-generating devices are responsive to perimeter range signals. U.S. Pat. No. 3,753,421 to Peck discloses a system which uses a wire to define the boundary of the area to which an animal is to be restrained. U.S. Pat. No. 4,898,120 to Brose sets forth a more sophisticated system in which the area in which an animal is to be restrained is determined by evaluating a signal sent from a transmitter on the animal to a central receiver. U.S. Pat. No. 5,067,441 to Weinstein uses a transmitting system which generates radio signals to be located in or adjacent an area in which an animal is to be restrained. U.S. Pat. No. 5,349,926 to McCarney et al. utilizes coded near infrared energy. Improvements upon these systems are set forth in U.S. Pat. No. 5,381,129 to Boardman and U.S. Pat. No. 5,353,744 to Custer.

While such restraining devices dispense with the need for a trainer to be in close proximity to an animal and require minimal vigilance by a trainer, these devices by their very design are restricted to use in breaking animals of a tendency to roam alone. They are of no or little aid in breaking animals of other undesired behaviors.

U.S. Pat. Nos. 3,608,524, 4,202,293 and 4,947,795 describe automatic devices to brake dogs of undesired "barking" behavior. Such "bark training" devices apply electric shocks and/or audible stimulus to a dog in response to loud vocalizations and employ vibration sensitive transducers directed at the neck of the dog to detect sound eminating from the dog's vocal cords. The problem with such devices is that they are fairly non-specific and may be inadvertently tiggered by a loud sound or by the animal making other acceptable noises (e.g. the sound signaling related to the fact that the dog needs to relieve itself).

Probably one of the most discomforting behaviors of certain domesticated animals is their propensity to attack. While leashes and other restraining devices help prevent such attacks, too often an animal is not restrained, or is inappropriately restrained, and not infrequently a person can not get out of the animal's confined space before the attack begins. Thousands of persons and pets are attacked by domesticated animals each year. These attacks not uncommonly lead to physical harm, and legal fees and headaches for owners. Heretofore, once an attack was initiated by a domesticated animal, the attacked could do little except to escape or confront the animal directly, and by means of buffeting dissuade it from continuing with the attack.

Other forms of undesired animal behavior short of attack or too frequent vocalizations are well known to the average pet owner. For example, it is not a rare occurrence to find an owner that is fraught with anger over the fact that their cat has clawed a gouge in their front door. And of course, there is an abundant number of pet owners who have woken up in the morning only to find that their pet, unable to wake them at night, in excretory exigency had decided that their living room rug looked similar enough to grass for purposes of taking a "constitutional."

Thus, it would be desirable to have a device which would dissuade undesirable animal behaviors beyond mere roaming which would require minimal direct contact of the trainer with the animal, would be specific toward the behavior of the animal, would require minimal vigilance by the trainer, and which might also provide a means by which verbal commands could be effectuated along with any stimulus bestowed to alter behavior.

A large body of art exists with respect to control of electrical devices by producing a sound or uttering a word. Such systems, known in the vernacular as "sound activated" or "voice activated" systems, are especially advantageous if a person (such as a paraplegic) is unable to physically manipulate a device, or if a person needs to be physically performing another task while concomitantly activating the device.

Sound recognition systems capable of recognizing distinct sounds are well-known in the art and are being applied today to control all sorts of electronic systems, including telephone dialing systems. Sound recognition systems have been around since at least the late 1960's, see, D. Raj Reddy, "Speech Recognition by Machine: A Review," published in the Proceedings of the IEEE, April 1976, page 501–531. Such systems are discussed in U.S. Pat. Nos. 4,148,750, 4,757,541, 4,633,499 and 4,158,750. Sound recognition has been proposed to be used for such wide varying uses as operating microwave ovens, U.S. Pat. No. 4,472,617, controlling welding systems, U.S. Pat. No. 4,641,292, controlling the operation of a computer, U.S. Pat. No. 4,776,016, controlling automotive equipment including cellular phones, U.S. Pat. No. 4,797,924, initiating use of a plurality of pieces of surgical equipment in an operating room, U.S. Pat. No. 5,345,538, activating specific operational modes of apparel manufacture equipment, U.S. Pat. No. 5,375,063, and controlling the operations associated with a hospital bed, U.S. Pat. No. 5,335,313. Techniques for generating profiles tailored to a particular user of the sound activated device are well-known in the voice recognition art, see, e.g., IEEE Transaction of Acoustical Speech and Signal Processing, "Dynamic Programming Algorithm Optimization for Spoken Word Recognition," Sakoe et al., Vol. ASSP-26, pp. 43–49, February 1978 and "On Creating Sampling Templates," Y. I. Liu, ICASSP, 1984. Commercially available systems which may be employed as a voice recognition computer includes the MICRO INTROVOICE™ by Voice Connexcion which utilizes a NEC V-25 microcomputer operating at 8 megahertz. The latter system is a voice input/output system which provides voice recognition with a high published accuracy. It includes a Voice Utility Program which provides for sound creation, editing, testing and maintenance. Such types of voice recognition systems permit a sound to be associated with an electronic control signal. Operator-tailored voice control may be advantageously changed by means of interchangeable voice memory cartridges, or memory modules, connectible to a voice recognition computer, such cartridges or modules permitting storage of a number of command profiles for a particular operator, as disclosed in U.S. Pat. No. 4,797,924.

While such sound recognition systems are widely employed today, relatively few of these systems are set to respond to anything other than human voice.. An example of a non-specific sound activated device is the sound sensored outdoor light which comes on when a sound above a certain decibel level is detected. An example of a sound-specific recognition system which responds to a sound other than human voice is the well-known "clapper" type device which is used to turn lights on and off upon clapping the hands together.

Like humans, other animals produce certain distinct sounds which frequently correlate well with animal behavior. For example, an attacking dog of most canine species produces what can be described as a "growling" sound. A dog which needs to go outdoors to relieve itself normally produces what can be described as a "whining" sound, a cow in need of milking a low nasal sound, etc. Heretofore, sound-specific recognition techniques have not be used to differentiate the sounds produced by animals, used to couple behavior modifying stimuli to animal or human sounds, or to couple automated or non-automated responsive action to the animal behavior eliciting the sound.

SUMMARY OF THE PRESENT INVENTION

Therefore, it is an object of the present invention to provide for a method and apparatus for modifying animal behavior by sound recognition or activation means coupled to meaningful responsive reaction. Further, it is an object of the present invention to provide for a soundspecific recognition method and apparatus which provides for tailored responses to behaviors eliciting particular animal sounds.

These objectives are attained in accordance with one aspect of the present invention directed to a sound-activation device coupled to an animal.

According to the present invention, a sound-activated, stimulus-generating, device is housed in a collar placed around the body of an animal, preferably the neck. Such device comprises a sound-processing means electronically coupled to a actuator means and a stimulus-generating means electronically coupled to such actuator means. The sound-processing means functions to convert sound waves into analog or digital signals. The sound-processing means may comprise a sound-wave responsive transducer. The sound-processing means may also comprise a microphone-based receiver. The actuator means may comprise a simple on-off analog circuit responsive to certain signals, or intensity of signals, transmitted by the sound-receiver means. The actuator means may also comprise a processor programmed to respond to a plurality of sounds in one or more ways. For example, the actuator means may be responsive to sounds emanating from the animal, to human voice (including limitation to the owner's voice), and/or to general sounds (such as scratching on a door). The stimulus-generating means is activated by output from the actuator means and may be aversive or non-aversive in nature. The stimulus-generating means may comprise an aversive electric shock device or a sound producing device, such sound being within and outside of the hearing of a human being, and may comprise a device coupled to a recording, or voice stimulation chip, which recording or chip relays verbal commands to the animal. The stimulus provided may be non-aversive in that the stimulus produced may placate the animal - such as a laudatory statement ("good dog") or soft music to calm the animal. The stimulus-generating means may also comprise a transmitter for transmitting a signal to a receiver such that the owner or caretaker of the animal is apprised of the animal's behavior, thereby permitting a measured response thereto.

An embodiment of the present invention is provided by an apparatus for controlling animal behavior comprising: a sound processing means; an actuator means electronically coupled to said sound-processing means; a stimulus-generating means coupled to said actuator means, said stimulus means including a human voice command with respect to said behavior. A further embodiment of the present invention is provided by an apparatus for controlling animal behavior comprising: a sound-processing means selectively responsive to on or more sounds; an actuator means coupled to said sound-processing means selectively responsive to one or more electrical inputs form said sound-processing means; a stimulus-generating means coupled to said actuator means. The actuator means of such apparatus may comprise a data processing means, and may further be activated only by receipt of signals from said sound processing means measuring sounds both from said animal and a human. The stimulus-generating means may comprise an electrical shock generating device, or sound generating means. If a sound generating means is used the sound may be undetectable by human ears but detectable by the animal upon which the device is placed. A yet further embodiment of the present invention is provided by an apparatus for signaling animal behavior comprising: a sound-processing means; an actuator means electronically coupled to said sound-processing means; a signal transmission-generating means coupled to said actuator means.

BRIEF DESCRIPTION OF THE DRAWINGS

For a more complete understanding of the objects of the present invention, the Detailed Description of the Illustrative Embodiments thereof is to be taken in connection with the following drawings, in which.

DETAILED DESCRIPTION OF THE ILLUSTRATIVE EMBODIMENT OF THE PRESENT INVENTION

Figure 1:
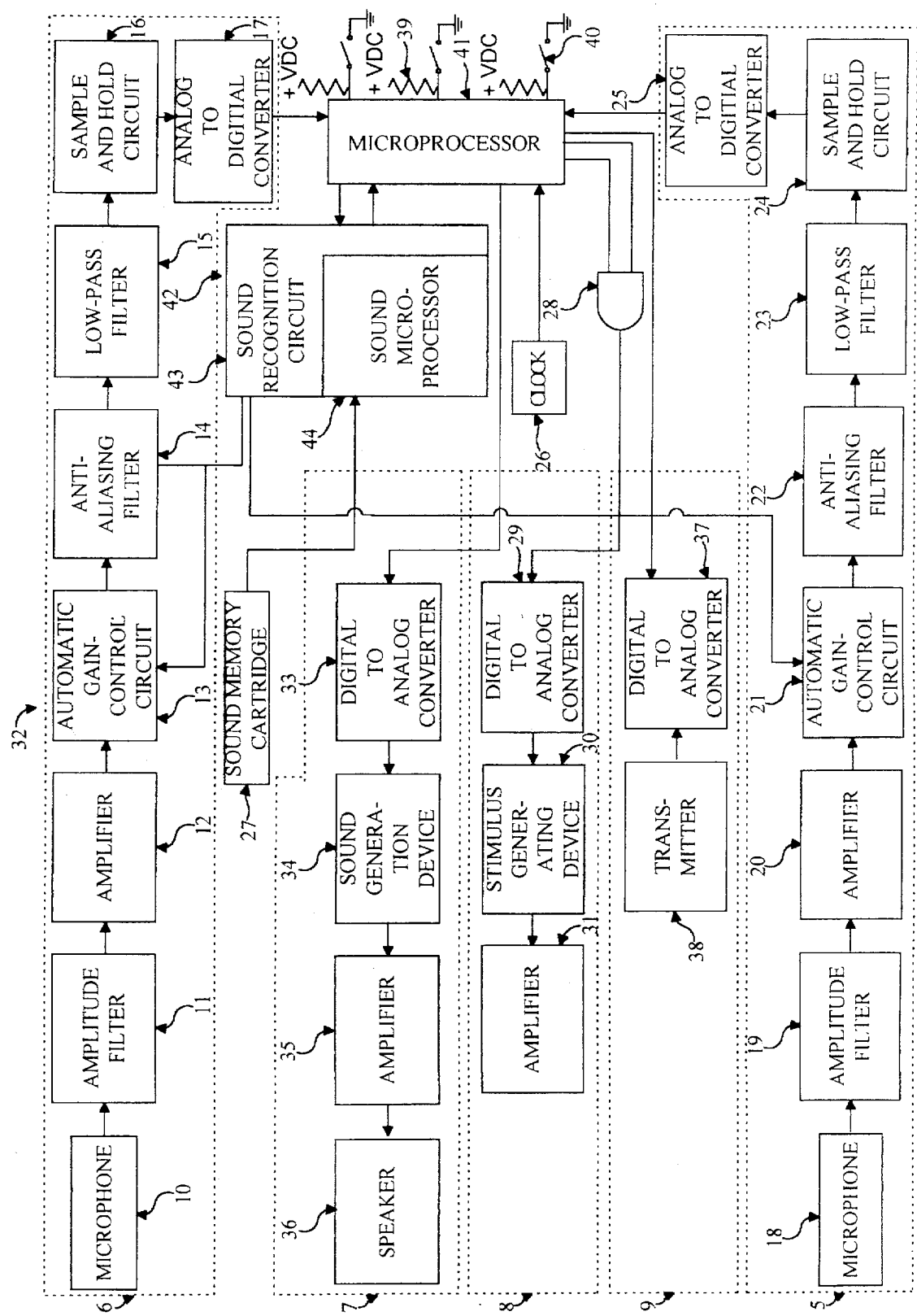
FIG. 1 is a block diagram of an embodiment of the present invention.

Referring to FIG. 1 of the drawings, the components of an embodiment of the present invention 32 are illustrated in block diagram format. As seen, microprocessor 41 is coupled to voice processor 24 which is comprised of voice recognition circuit 25 and sound microprocessor 26. The microprocessor 41 may comprise a one-chip microcomputer. The microprocessor 41 may permit both sound recognition and speech synthesis (such as the SP1000 chip manufactured by General Instruments). The program executed by microprocessor 41 upon activation is determined by the status of a plurality of switches 40, actuation of such switches 40 causing generation of a low logic signal by completing a path to ground, while non-actuation of such switches 40 producing a high logic signal due to the effect of pull-up resistors 39. Microprocessor 41 is further coupled to a clock 32 providing a means for determining time intervals between signals and duration of a train of signals. A plurality of audio input circuits 5 and 6 further provide input into microprocessor 41 permitting comparison of sound signals received by each circuit with the other. Audio input circuit 6 includes microphone 10, amplitude filter 11 for limiting input to microprocessor 41 to signals of a set amplitude, and amplifier 12 which amplifies analog electrical signals which have been converted from mechanical sound waves received at microphone 10. Amplifier 12 is coupled to an automatic gain control circuit 13 which receives an input from the amplifier 12 and generates an output which has been scaled by a factor dictated by a digital input to the automatic gain control circuit 13. Gain control circuit 13 assures that output from the audio circuitry 6 is maintained at an appropriate level for input to the sound recognition circuit 43. An analog output from the automatic gain control circuit 13 may pass through anti-aliasing filter 14 to correct for any error due to non-Shannon-Nyquist sampling if the duty cycle is not large enough to satisfy the Nyquist relation for data sampling, and through low-pass filter 15 to sample and hold circuit 16. Timing of this transferral is controlled by a timing circuit of a type well-known in the art having a number of flip-flops which coordinate transmission of the analog signal to sample and hold circuit 16. The analog signal sample is then transmitted to analog-to-digital converter 17, again at a rate controlled by the timing circuit. The analog-to-digital converter 17 converts the analog input from the sample and hold circuit to a digital datastream for processing by microprocessor 41.

In a preferred embodiment, at least one microphone 10 of one audio input circuit 5 is directed towards the animal such that it preferentially receives sounds from the animal, and another microphone 10 is directed away from the animal such that it picks up sounds generated by means other than the animal. Further microphones and audio input circuits, as would be known to one skilled-in-the-art, may also advantageously be employed to cancel noise. Upon receipt of input from audio input circuits 5, microprocessor 41 accesses sound recognition chip 42, comprising sound recognition circuitry 43 and sound microprocessor 44, and ascertains whether the input received correlates with a digital representation of a sound stored in sound microprocessor's 44 memory. As is shown, sound microprocessor 44 memory may be connected to sound memory cartridge 27 permitting rapid changing of operator-specific sound recognition parameters. Upon recognition of a sound, or at a set time after cessation of a sound, or upon passage of a pre-determined time period after receipt of a string of sounds separated by less than a chosen time period, such time period being adjudged by communication with clock 26, microprocessor 41 initiates through its programming a plurality of signals to a plurality of stimulus-generating circuits 7, 8, 9, such signals corresponding to the sound or sounds received. Such stimulus circuitry may include a means for generating a sound, as for example stimulus circuitry 7 comprising digital-to-analog converter 33, sound generation device 34, amplifier 35 and speaker 36. Sound generation device 34 may be a simple analog sound producing circuit, may be a sound-generating microprocessor, may be coupled to a digital or analog recording, such as a recording of the trainer's voice, and may produce sounds in or outside of the hearing of human beings. Other stimulus-generating circuitry may comprise a circuit for transmitting a signal to a remote receiver, as for example stimulus-generating circuit 9, comprising digital-to-analog converter 37 and transmitter 38.

Still other stimulus-generating circuitry may comprise a circuit for causing a physical stimulus to be applied to the animal, such as stimulus-generating circuit 8 which comprises stimulus generating device 30 interposed between digital-to-analog converter 29 and stimulus amplifier 31. Microprocessor 41 may be directed by its programming to send a stimulus signal only upon receipt of two or more recognizable audio inputs or it may output such signals upon validation of audio input, such signals being processed thereafter, as by, for example, "and gate" 28, such that two or more signals are necessary for activation of the stimulus-generating circuitry.

Figure 2:
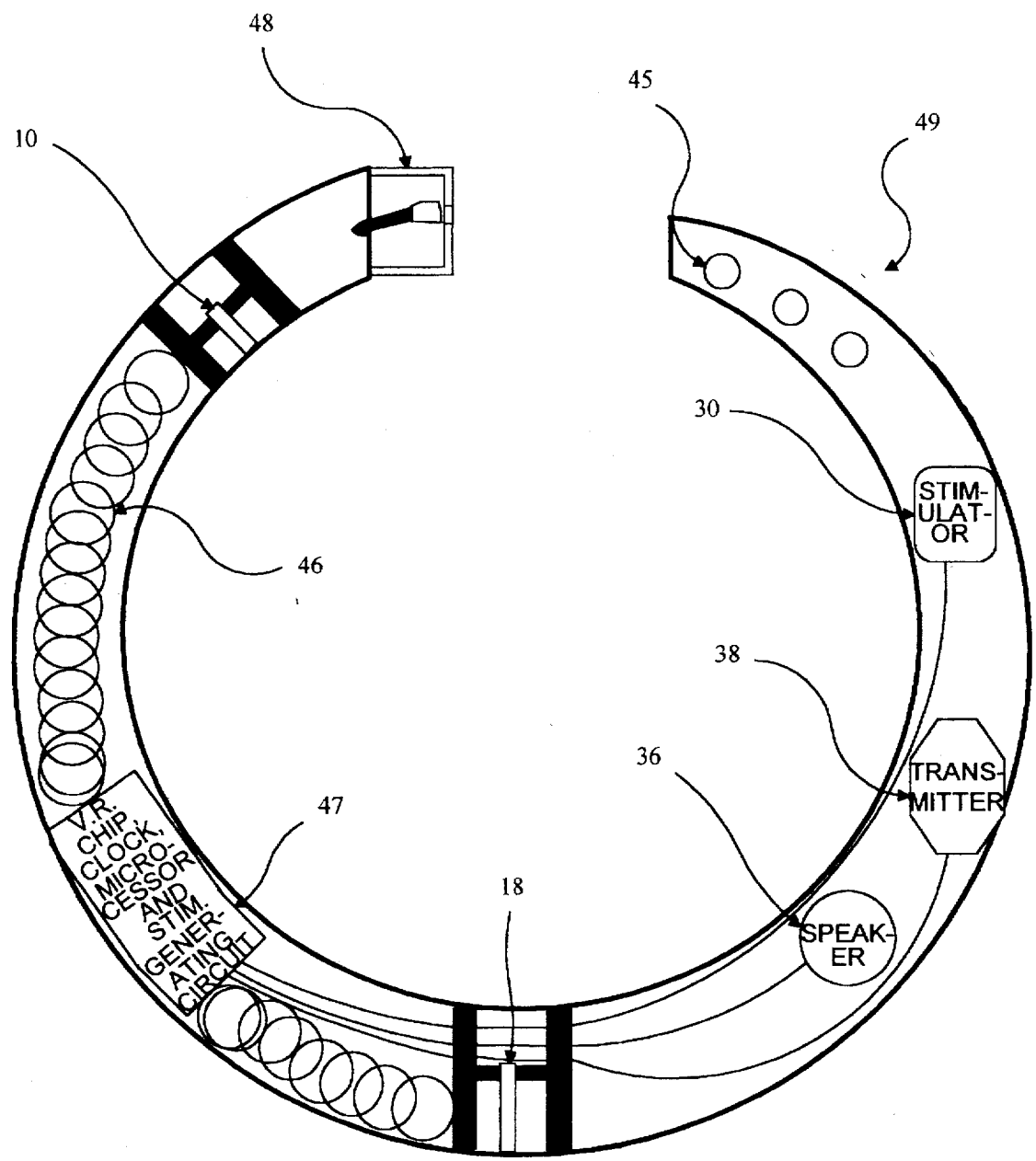
FIG. 2 is a top cross-sectional view of an embodiment of the present invention housed in a pet collar.

Referring now to FIG. 2, there is shown a top cross-sectional view of an embodiment of the present invention housed in collar 49 attachable to a pet by means of buckle 48 and holes 45. As shown sound recognition chip 42, clock 26, microprocessor 41, and part of stimulus-generating circuit 7, 8, 9 are housed in housing 47 within, or on, the collar. By means of flexible connection 46, audio input circuitry 10, 18 is electrically coupled to the circuitry of housing 47. As illustrated the microphone of audio input circuit 10 is directed towards the animal, preferably its throat, whereas the microphone of audio input circuit 18 is directed away from the animal. Such positioning is found if the collar as illustrated is placed such that buckle 48 is on the underside of the animal's neck. Stimulus may comprise activation of speaker 36 or transmitter 38, which, as shown, is directed towards the ears of the animal. Stimulus may also comprise activation of stimulator 30, which may comprise a shock device.

Figure 6:
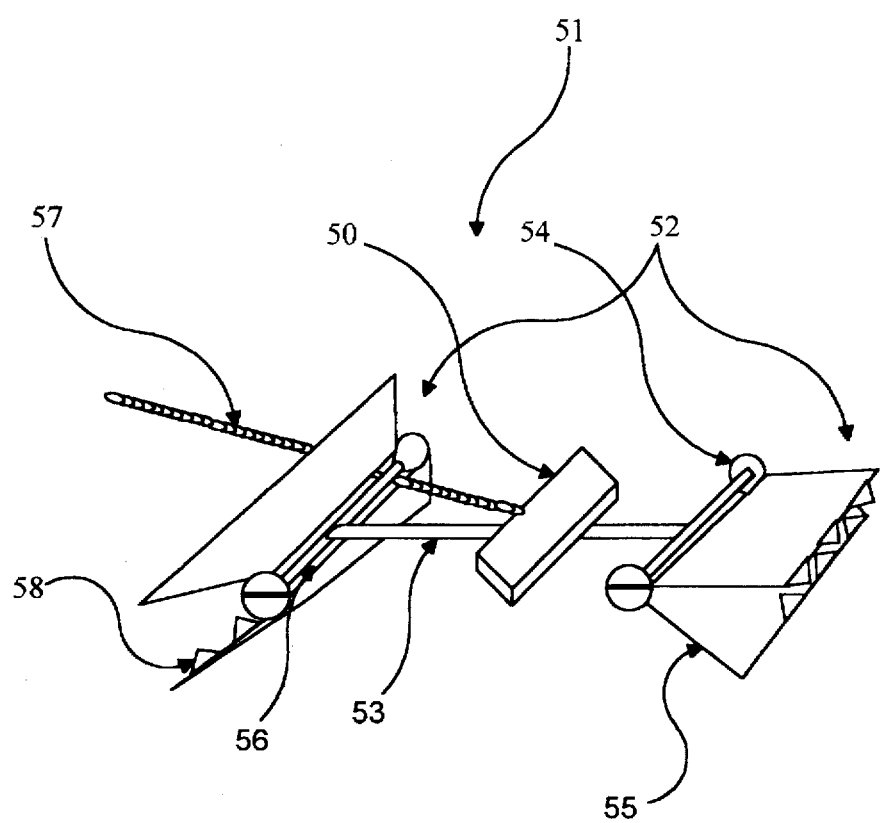
FIG. 6 is a side-view of a device for attaching components of the present invention to a standard animal collar.

Referring now to FIG. 6, there is shown a side-view of a device 51 for attaching one or more components of the present invention to a standard animal collar. As is seen, component 50 is affixed to I-bar 53 which is hingedly affixed at both cross-ends to clamps 52. Both clamps 52 are comprised of two pivoted sheets 55 attached by hinging means 54. The two pivoted sheets 55 are hinged such that they form gap 56 between the same. Gap 56 of each clamp 52 provides a means for inserting device 51 onto a standard animal collar, as well as providing space for concourse of flexible-component connecting means 57, such that components of the system can be connected with one another. Both clamps 52 further provide for interlocking gripping means 58 which permits for solid attachment of device 51 to a collar inserted through gap 56 of each clamp.

Figure 3:
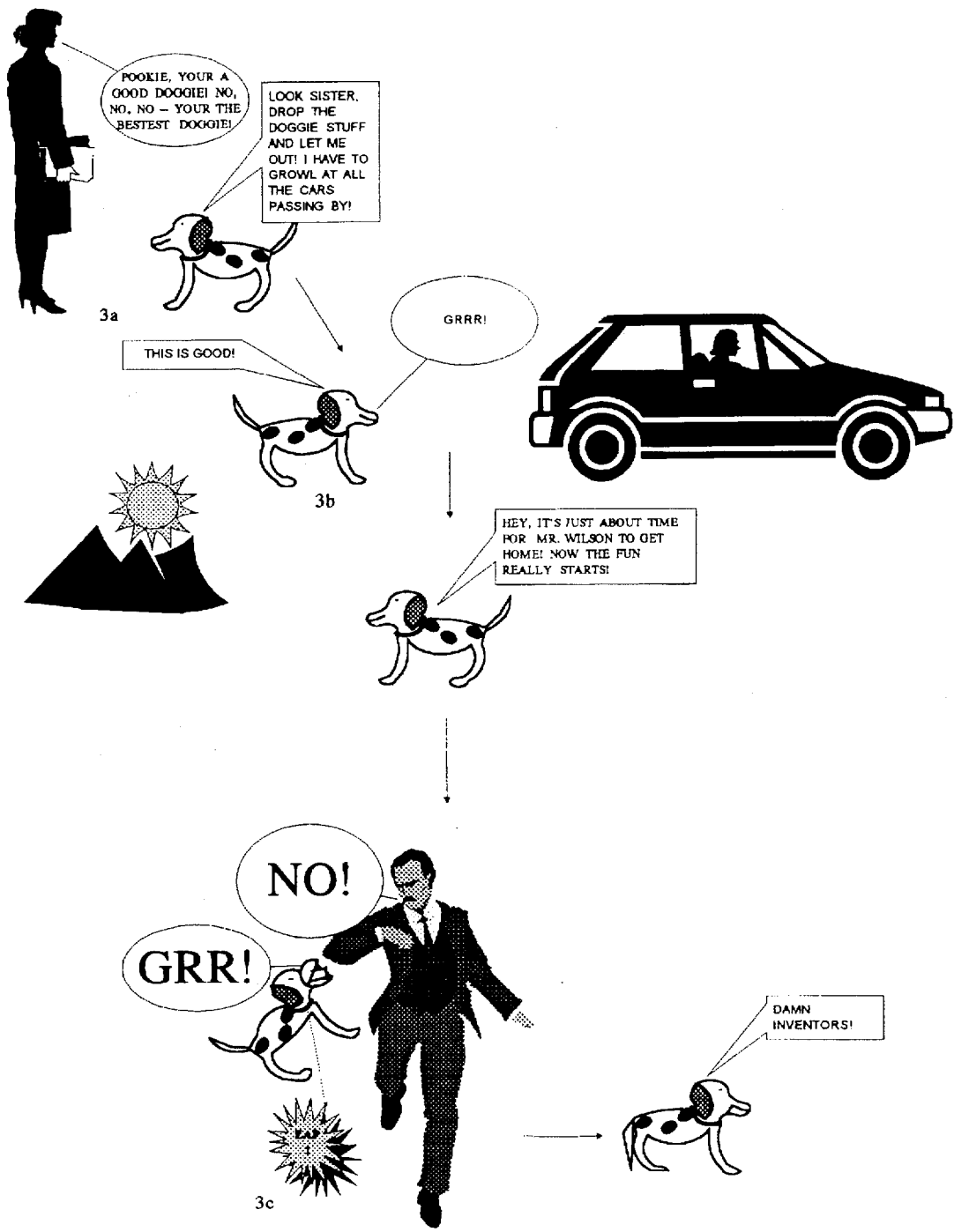
FIG. 3 is a schematic illustration of an employment of the present invention in which human and animal sound inputs are necessary for activation of the stimulus-generating means.
Figure 4:
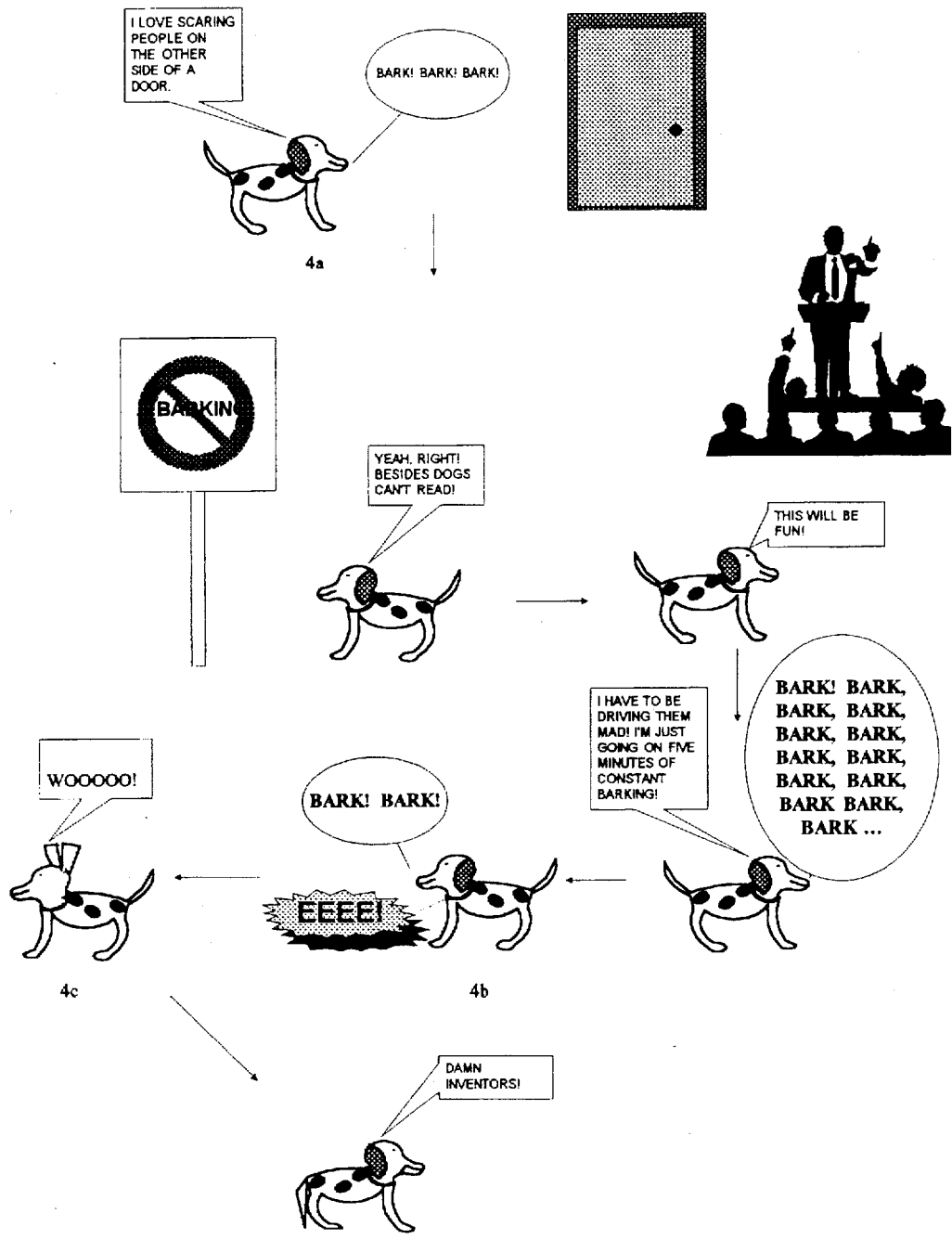
FIG. 4 is a schematic illustration, of an employment of the present invention in which the stimulus-generating means is activated only after receiving a particular animal sound input over a set period of time.
Figure 5:
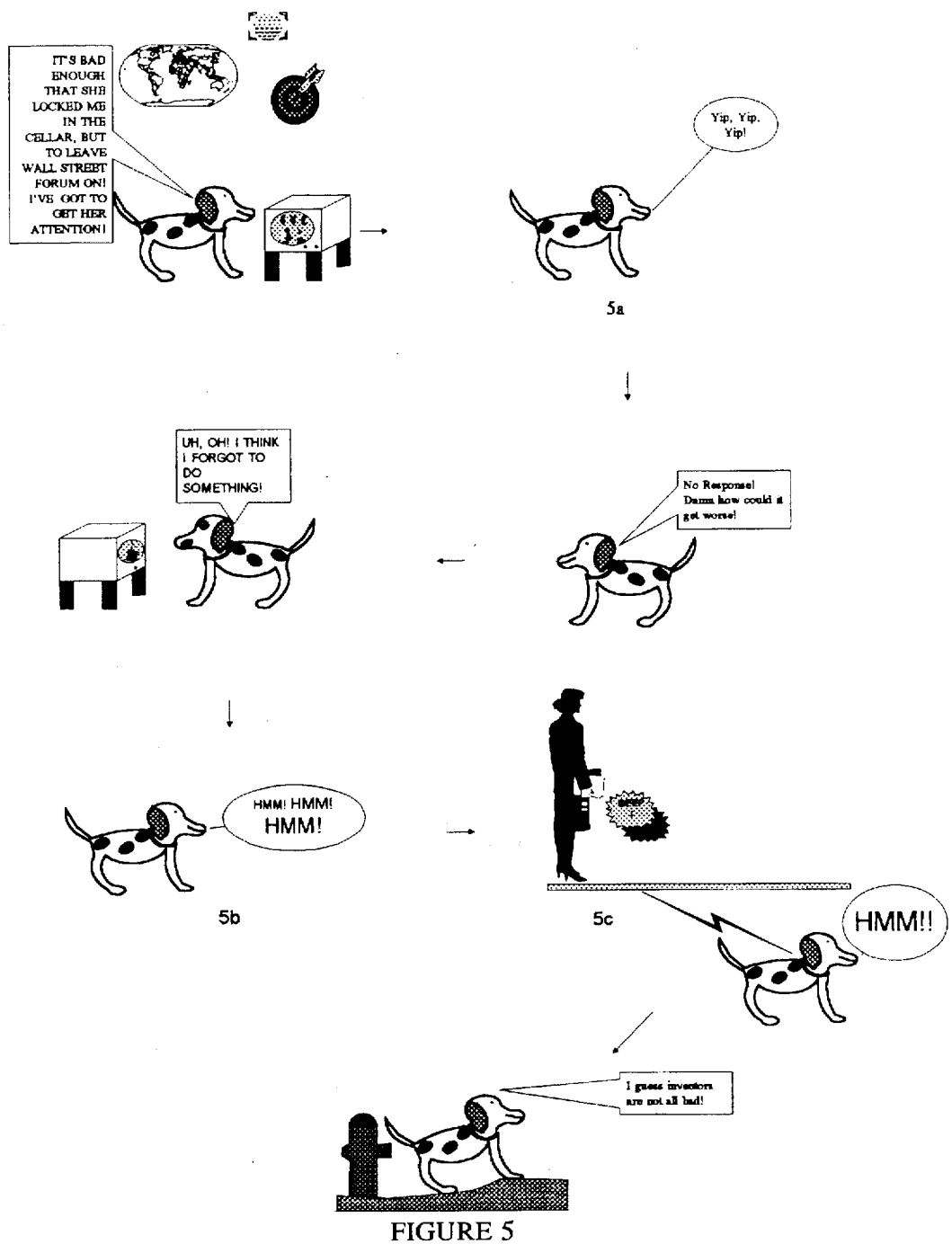
FIG. 5 is a schematic illustration of an employment of the present invention in which the stimulus-generating device is a transmitter responsive to sound produced by the animal and such transmitter is electronically coupled to a receiver.

And referring to FIGS. 3–5, there is shown schematic illustrations of different employments of the present invention.

FIG. 3 illustrates the microprocessor being programmed, or connected to "and-gate" circuitry, such as to activate a stimulus only upon concomitant receipt of select human and animal sound inputs, such dual-input being used to dissuade an animal from continuing an attack on a person. As illustrated in FIG. 3, sound recognition chip 42, is programmed to recognize the human sound "no" and the animal sound "grr." Recitation of either sound alone 3a, 3b, produces no stimulation. However, vocalization of the word "no" at a particular volume, concomitantly with vocalization of the sound "grr," also at a particular volume, eventuates in concomitant recognition of both sounds by sound recognition chip 42, causing microprocessor 41 to activate an adverse stimulus 3c, in this case a "zap," which dissuades the animal from further attacking. The sound recognition chip 42 can be one of many sound microcomputer chips and may entail relatively simple processing of the electrical signals related to the sound input such as those microcomputer chips that count zero voltage crossings within a short interval of time, such as the decade old Hitachi HD6805U1 sound recognition unit, having an NMOS 8-bit microcomputer containing a CPU, on-chip clock, ROM, RAM, I/O and timer. The latter chip type may be conditioned so as to measure zero-crossings in two or more frequency bands, so as to recognize and differentiate the two sounds.

FIG. 4 illustrates the microprocessor 41 being programmed such as to activate a stimulus only upon receipt, and recognition by sound recognition chip 42, of a select animal sound input over a set period of time. Time measurements can be made by means of external clock 26, such as LM555, manufactured by Radio Corporation of America, New York, N.Y., or can be by means of an internal clock within the microprocessor. As illustrated in FIG. 4, sound recognition chip 42, is programmed to recognize the animal sound "bark" at a certain volume level. Vocalization of the "bark" sound alone for less than a pre-programmed time period at too low of a volume produces no stimulation 4a. However, vocalization of the sound "bark," or a string of barks separated by no more than a certain period of time, over a pre-defined period, and over a certain volume threshold, causes microprocessor 41 to activate an aversive stimulus 4b, 4c, in this case a shrill sound which dissuades the animal from further attacking. Such shrill sound can be within or outside of human hearing, but should be detectable within the animal's hearing.

FIG. 5 illustrates employment of the present invention in which the stimulus device is a transmitter 38 responsive to sound produced by the animal and such transmitter is electronically coupled to a receiver. As illustrated in FIG. 5, sound recognition chip 42, is programmed to recognize the animal sound "hmmr." Vocalization of any other animal sound such as "yip" 5a is not recognized by sound recognition chip 42 and therefore produces no stimulation, which in this case is activation of transmitter 38. Vocalization of the sound "hmm," on the other hand, at an appropriate volume 5b, eventuates in recognition of the sound by sound recognition chip 42, causing microprocessor 41 to activate the transmitter 38, 5c. Signal from the transmitter 38 is directed to a receiver. Receipt of the signal by the transmitter 38 may eventuate in the processing of data, lead to an automated reply to respond to the behavior eliciting the sound, or, as shown, may alert the owner of the animal as to the behavior eliciting the sound such that the owner may reply to the behavior eliciting the sound.

What is claimed is:

1. An apparatus for controlling the behavior of an animal comprising:

a sound-processing means for processing one or more specific sound vocalizations produced by said animal distinctly related to the emotional state of said animal, such as whimpering, barking, purring, growling, yawning or other animal vocalization; said sound processing means differentiating between different animal sounds by comparing said animal sounds with data stored in memory;

an actuator means electronically coupled to said sound-processing means, said actuator being actuated by said sound-processing means upon recognition by said sound-processing means of said one or more specific sounds;

a stimulus-generating means coupled to said actuator means, said stimulus-generating means providing a stimulus to said animal upon actuation of said actuator, said stimulus consisting of, or including, a human voice command responsive to the said specific sound vocalization.

2. An apparatus for controlling the behavior of an animal comprising:

a sound-processing means selectively responsive to two or more different specific sound vocalizations emanating from said animal distinctly related to the emotional state of said animal, such as whimpering, barking, purring, growling, yawning or other animal vocalization;

an actuator means coupled to said sound-processing means selectively responsive to one or more electrical inputs from said sound-processing means;

a stimulus-generating means coupled to said actuator means, said stimulus means providing a stimulus to said animal upon actuation of said actuator.

3. The apparatus of claim 2 wherein said actuator means comprises a data processing means.

4. The apparatus of claim 2 wherein said stimulus generating means comprises an electrical shock generating device.

5. The apparatus of claim 2 wherein said stimulus generating means comprises a-sound generating means.

6. The apparatus of claim 5 wherein said sound generating means produces sounds undetectable by human ears but detectable by the animal upon which the device is placed.

7. The apparatus of claim 2 coupled to the body of an animal.

8. An apparatus for controlling animal behavior comprising:

a sound-processing means responsive to both human and animal vocalizations;

an actuator means coupled to said sound-processing means selectively responsive to one or more electrical inputs from said sound-processing means;

a stimulus generating means coupled to said actuator means;

wherein said actuator means is actuated only when said sound-processing means measures sounds both from an animal and a human.

9. The apparatus of claim 8 wherein said actuator means is selectively responsive to either human or animal sounds measured by said sound-processing means.

10. An apparatus for signaling animal behavior, comprising:

a means for processing vocalizations emanating from an animal; said means for processing differentiating between different animal vocalizations by comparing said animal vocalizations with data stored in memory;

a receiver means at a position remote to said animal;

an actuator means electronically coupled to said vocalization-processing means, said actuator being actuated by said vocalization-processing means upon recognition by said vocalization-processing means of one or more pre-determined vocalizations emanating from said animal;

a signal transmission-generating means, for generating aerially-transmitted electromagnetic waves, electronically coupled to said actuator means, said signal transmission-generating means transmitting said aerially-transmitted signal to said receiver means upon actuation of said actuator means.

11. The apparatus of claim 10 further comprising a device electronically coupled to said receiving means for automated response to said animal behavior eliciting said signal.

* * * * *